United States Patent [19]
Dezonno

[11] Patent Number: 5,712,954
[45] Date of Patent: Jan. 27, 1998

[54] SYSTEM AND METHOD FOR MONITORING AUDIO POWER LEVEL OF AGENT SPEECH IN A TELEPHONIC SWITCH

[75] Inventor: Anthony J. Dezonno, Downers Grove, Ill.

[73] Assignee: Rockwell International Corp., Seal Beach, Calif.

[21] Appl. No.: 518,413

[22] Filed: Aug. 23, 1995

[51] Int. Cl.⁶ .................... G10L 3/02; H04M 3/50
[52] U.S. Cl. ................ 395/2.34; 379/266; 379/268
[58] Field of Search .............. 395/2.34; 379/178, 379/202, 266, 268, 269

[56] References Cited

U.S. PATENT DOCUMENTS

| | | | |
|---|---|---|---|
| 4,197,429 | 4/1980 | Sparber | 379/204 |
| 4,661,981 | 4/1987 | Henrickson et al. | 395/2.33 |
| 4,777,649 | 10/1988 | Carlson et al. | 395/2.42 |
| 5,260,938 | 11/1993 | Hofmann | 370/269 |
| 5,471,527 | 11/1995 | Ho et al. | 379/347 |
| 5,533,112 | 7/1996 | Danneels | 379/202 |
| 5,621,789 | 4/1997 | McCalmont et al. | 379/265 |

*Primary Examiner*—Allen R. MacDonald
*Assistant Examiner*—Talivaldis Ivars Smits
*Attorney, Agent, or Firm*—Welsh & Katz, Ltd.

[57] ABSTRACT

A system 200 and method for monitoring audio power level of speech of an agent in an automatic call distributor 100 is provided. The system 200 comprises an agent audio power circuit for detecting the audio power level of the agent's speech. The audio power circuit includes an agent maximum circuit 216 for comparing the detected audio power level to a predetermined maximum threshold power level. An agent minimum circuit 218 compares the detected audio power level to a predetermined minimum threshold power level. When the detected audio power level exceeds, or equals, the maximum threshold power level, or when the detected audio power level is less than, or equals, the minimum threshold power level, an appropriate message is displayed on an agent terminal 118 to "Speak Softer" or to "Speak Louder". An agent gain control 220 may be provided for automatically adjusting the audio power level of the agent's speech.

21 Claims, 3 Drawing Sheets

SYSTEM AND METHOD FOR MONITORING AUDIO POWER LEVEL OF AGENT SPEECH IN A TELEPHONIC SWITCH

BACKGROUND OF THE INVENTION

The present invention is related generally to systems for reporting data relative to the operation of a telephonic switch, such as an automatic call distributor, which routes an incoming telephone call from a caller to a selected agent and, more particularly, to a system and method for detecting audio power level of speech of the agent or the caller during an incoming telephone call routed through a telephonic switch, for notifying the agent when the agent's speech is either too loud or too soft, and preferably for electronically adjusting the audio power of the agent's speech to conform to predetermined maximum and minimum levels.

Automatic call distribution (ACD) systems are increasingly being used by businesses to automatically route incoming customer calls to available agents. ACD systems generally include a multiport switch controlled by a central processing unit to interconnect external telephonic units of an external telephonic network with internal telephonic units. An example of such an ACD system is disclosed in U.S. Pat. No. 5,140,611 issued to Jones et al. on Aug. 18, 1992, entitled "Pulse Modulated Self-Clocking and Self-Synchronizing Data Transmission and Method for a Telephonic Communication Switching System", the disclosure of which is hereby incorporated by reference.

ACD systems provide for acquiring, processing and reporting information concerning different aspects of activity within the system. Typically, this information is presented in printed reports and/or displayed on a display terminal to a supervisor or agent. Based on this information, supervisory personnel and agents are able to evaluate the handling of calls within the automatic call distributor and, if necessary, make changes for more efficient ACD system operation.

Unfortunately, very little information relating to the actual conversation between an agent and a caller is reported by the prior ACD systems. Supervisors typically must listen into an incoming telephone call to monitor an agent's telephone manners and the like. Until a complaint is received by a caller about a particular agent, the supervisor may spend a significant amount of time monitoring agents who are quite proficient at handling callers. Such a review process may result in the supervisor unnecessarily wasting time listening to proficient agents.

Of course, a particular agent may be monitored after receiving a complaint from a caller. However, this is very inefficient since some, and possibly most, callers will not call to complain about an agent. They will simply be irritated and, in the worst case, never again call the company. This is obviously unacceptable to companies which depends heavily upon telephone customers, such as a telemarketing firms.

The loudness or softness of an agent's speech may be one area of concern for supervisors. An agent who is speaking too loudly may be perceived by the caller as being hostile or threatening. In addition, an agent speaking too loudly may be very irritating and annoying to some callers. An agent who is speaking too softly may similarly be irritating to callers. A caller may not hear what the agent is saying and miss important information. Other callers may have to repeatedly request that the agent speak louder. These repeated requests are time consuming and annoying to the caller. Unfortunately, agents may not even be aware of their propensity to speak either too loudly or too softly.

Accordingly, there is a need in the art for a system and method for monitoring audio power levels of speech of an agent during an incoming telephone call and for alerting the agent, or a supervisor, when the agent is speaking either too loudly or too softly. The present invention may further automatically increase or decrease the audio power level of the agent's speech to maintain the audio power level between predetermined maximum and minimum threshold power levels.

SUMMARY OF THE INVENTION

This need is met by a system and method for monitoring audio power levels of speech during an incoming telephone call from a caller wherein the audio power level of the agent's speech is continually detected and messages are sent to the agent when the detected audio power level equals or exceeds a maximum threshold power level or when the detected audio power level equals or is less than a minimum threshold power level. In addition, the present invention provides a system and method which automatically increases or decreases the audio power level to maintain the agent's speech within the maximum and minimum threshold power levels.

In accordance with one aspect of the present invention, a system is provided for monitoring the audio power level of the agent's speech. An agent audio power circuit detects the audio power level of speech of the agent during the incoming telephone call. A reporting mechanism then reports the detected audio power level. Preferably, the detected audio power level is reported to the agent or other supervisory personnel.

The agent audio power circuit may comprise an agent comparison circuit for comparing the detected audio power level to a predetermined threshold power level. In particular, the agent comparison circuit comprises an agent maximum circuit for comparing the detected audio power level to a predetermined maximum threshold power level and an agent minimum circuit for comparing the detected audio power level to a predetermined minimum threshold power level. When the detected audio power level exceeds, or equals, the maximum threshold power level or is less than, or equals, the minimum threshold power level, an appropriate maximum or minimum alert message is displayed to the agent.

In accordance with another aspect of the present invention, a method for monitoring speech of an agent during an incoming telephone call with a caller is provided. The method comprising the steps of: detecting audio power level of the speech of the agent during the incoming telephone call; and using the detected audio power level to adjust the audio power level of the speech of the agent.

The method may comprise the step of comparing the detected audio power level to a threshold power level. The detected audio power level is then reported based on the comparison of the detected audio power level to the threshold power level. The step of comparing the detected audio power level to the threshold power level may comprise the steps of: establishing a maximum threshold power level; and comparing the detected audio power level to the maximum threshold power level. Further, the step of comparing the detected audio power level to the threshold power level may comprise the steps of: establishing a minimum threshold power level; and comparing the detected audio power level to the minimum threshold power level.

The step of using the detected audio power level preferably comprises the step of automatically adjusting the audio power level of the speech of the agent based on the detected audio power level. The step of automatically adjusting the audio power level comprises the steps of: comparing the detected audio power level to a maximum threshold power level; and automatically decreasing the audio power level of the speech of the agent when the detected audio power level is greater than the maximum threshold power level. The step of automatically adjusting the audio power level may comprise the steps of: comparing the detected audio power level to a minimum threshold power level; and automatically increasing the audio power level of the speech of the agent when the detected audio power level is less than the minimum threshold power level.

In accordance with yet another aspect of the present invention, a system for regulating audio power level of speech during an incoming telephone call from a caller is provided. The system comprising an agent audio power circuit for detecting the audio power level of speech of the agent during the incoming telephone call and an agent gain control for automatically adjusting the audio power level of the speech of the agent based on the detected audio power level.

It is thus a feature of the present invention to provide a system and method for monitoring audio power level of speech of an agent and for generating messages when the audio power level exceeds a maximum threshold power level or is less than a minimum threshold power level.

It is further a feature of the present invention to provide a system and method which automatically adjusts the audio power level of the agent's speech. The audio power level of the agent's speech is automatically adjusted to a level between a maximum threshold power level and a minimum threshold power level.

These and other features and advantages of the present invention will become apparent from the following detailed description, the accompanying drawings and the appended claims.

DETAILED DESCRIPTION OF THE INVENTION

Figure 1:
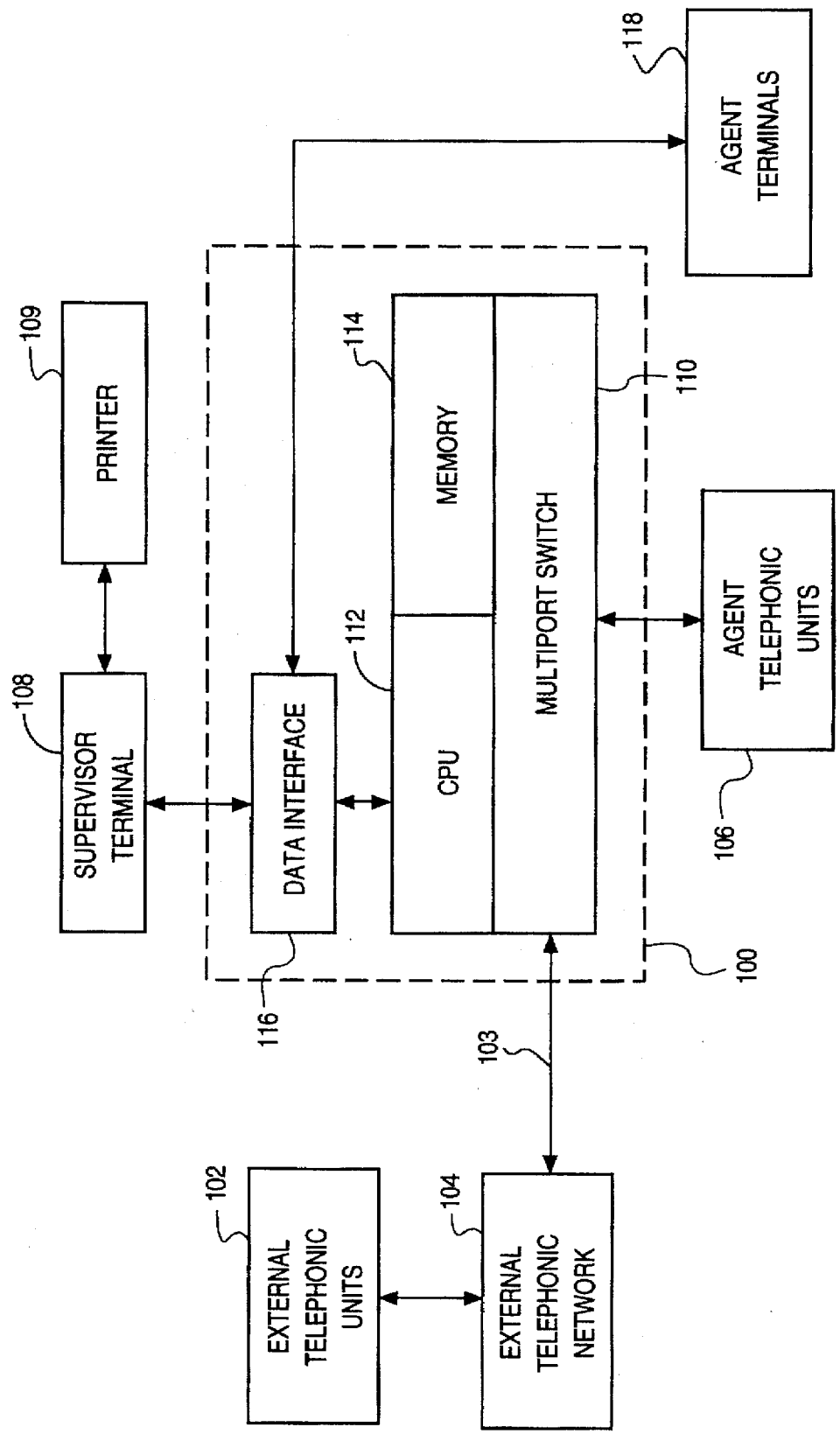
FIG. 1 is a schematic block diagram showing an automatic call distributor for routing incoming telephone calls from external telephonic units and to agent telephonic units.

A telephonic switch, such as automatic call distributor (ACD) 100, is shown in FIG. 1 in which a system and method in accordance with the present invention for monitoring audio power level of speech of an agent when the agent is conversing with a caller during an incoming telephone call and for alerting the agent if the detected audio power level equals and/or exceeds a predetermined maximum threshold level or equals and/or falls below a predetermined minimum threshold level may be advantageously implemented. The ACD 100 routes incoming telephone calls received from external telephonic units 102 via a telephonic line 103 and an external telephonic network 104 to a plurality of agent telephonic units 106. As will be readily apparent to those skilled in the art, the telephonic switch, shown as ACD 100, may be any of a number of different call switching systems, or devices.

The ACD 100 is connected to a supervisor terminal 108, which preferably includes a data display unit for displaying information relating to the operation of the ACD 100. The supervisor terminal 108 is preferably connected to a printer 109 for generating printed records of information relating to the operation of the ACD 100. The ACD 100 has a multiport switch 110 for routing incoming telephone calls to selected ones of the agent telephonic units 106. The multiport switch 110 is controlled by a central processing unit (CPU) 112, or other suitable computer circuit, having an associated memory 114. The CPU 112 is appropriately programmed to route incoming telephone calls through the ACD 100. Preferably, the processing power of the CPU 112 is provided by a 32 bit Motorola 68030 microprocessor.

Agent terminals 118, which may include conventional display units, display information relating to the operation of the ACD 100 to the agents receiving the incoming telephone calls. A data interface 116 provides communications between the CPU 112, the supervisor terminal 108 and the agent terminals 118. As will be readily apparent, the structure and philosophy of the above components of the ACD 100 are well known in the art and will not be further discussed herein. Further, other configurations of the ACD 100 can be advantageously employed in the present invention. For example, the agent terminals 118 may be an integral part of the agent telephonic units 106, such as digital displays on a telephone or telephonic console.

Figure 2:
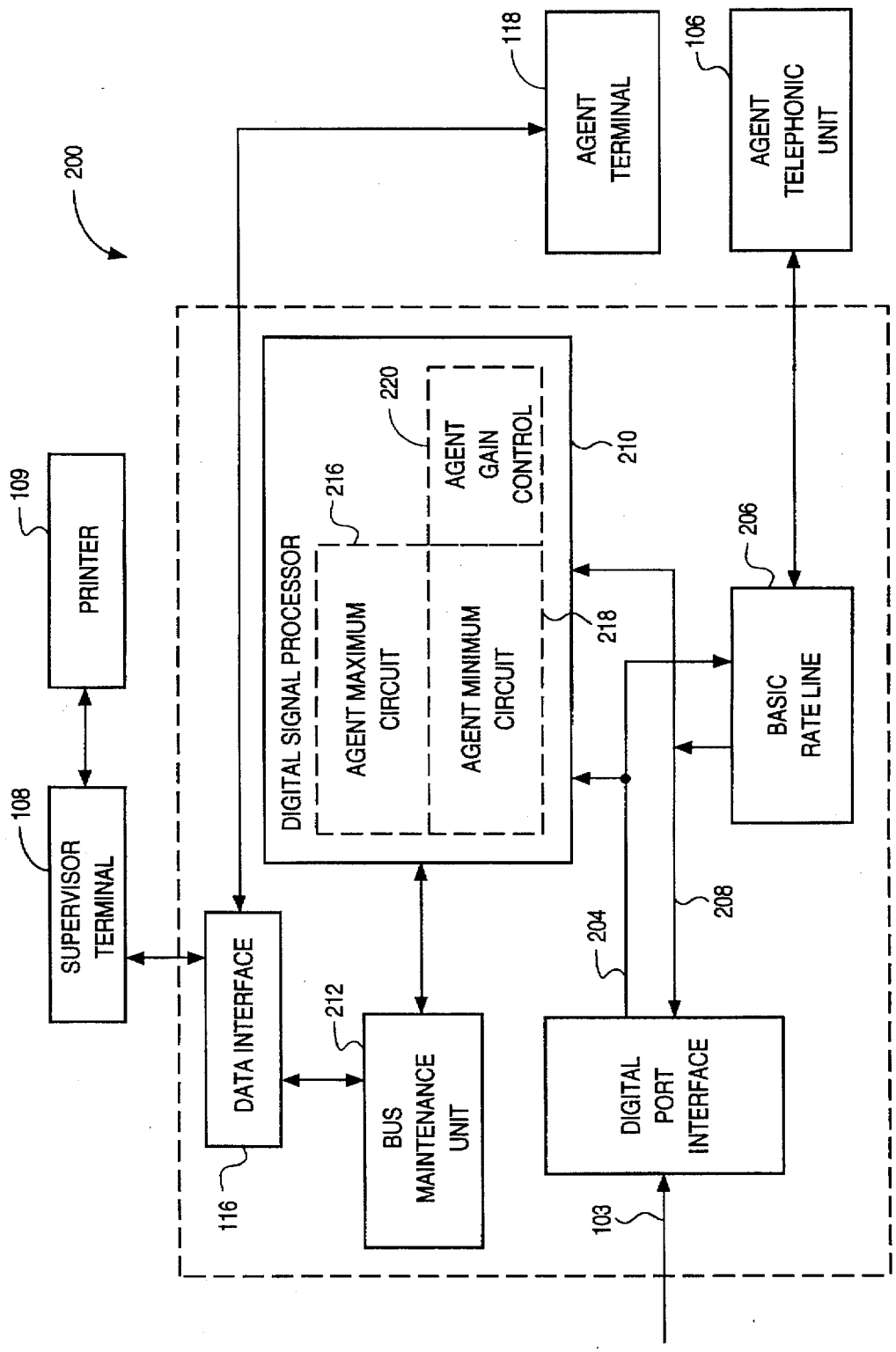
FIG. 2 is a schematic block diagram showing an agent audio power circuit comprised of an agent maximum circuit, an agent minimum circuit and an agent gain control in accordance with the present invention included in the automatic call distributor shown in FIG. 1.

A schematic diagram of a system 200 for monitoring audio power level of speech of an agent during an incoming telephone call in accordance with the present invention is shown in FIG. 2. A digital port interface 202 interfaces the ACD 100 with the external telephonic network 104. A first bus 204 transmits caller audio signals, representative of the caller's voice) from the digital port interface 202 to a basic rate line interface 206 for transmission to the agent telephonic unit 106. For clarity and ease of description only one agent telephonic unit 106 is shown in FIG. 2. However, it should be understood that the ACD 100 is preferably connected to a plurality of agent telephonic units 106 and agent terminals 118 and one of the units 106 is selected to receive any one incoming telephone call. A second bus 208 transmits agent audio signals, representative of the agent's voice, from the basic rate line interface 206 to the digital port interface 202 for transmission to the external telephonic units 102 to establish voice communications between the agent and the caller.

A digital signal processor 210 analyzes the caller and agent audio signals on the respective first and second busses 204 and 208. The digital signal processor 210 preferably comprises one or more data analyzing circuits which are programmable. The structure and philosophy of a preferred digital signal processor is disclosed in commonly assigned U.S. Pat. No. 5,434,981; entitled "A Functionally Programmable PCM Data Analyzer and Transmitter for Use in Telecommunications Equipment" to Lenihan et al., and having an issue date of Jul. 18, 1995, the disclosure of which is hereby incorporated by reference. A bus maintenance unit 212 controls the data transmitted from and to the data interface 116.

For purposes of the present invention, the digital signal processor 210 comprises an agent audio power circuit for detecting the audio power level of speech of the agent during the incoming telephone call. For example, the agent audio power circuit may include a voltmeter which detects the voltage on the second bus 208 which is representative of the speech of the agent. The agent audio power circuit may operate in any of a number of well known methods. Typically, the agent's speech is encoded into a pulse code modulated (PCM) signal for transmission over the second bus 208. The agent audio power circuit collects successive time series of the PCM signal. As is well known by those skilled in the art, the density of the digital PCM signal is representative of the voltage on the second bus 208. The audio power level is then determined by dividing the detected voltage by the resistance of the telephone connection between the agent and the caller. This resistance is usually about 600 to 900 ohms.

The agent audio power circuit preferably comprises an agent comparison circuit 214 which compares the detected audio power level to a predetermined threshold power level. An agent maximum circuit 216 establishes a maximum threshold power level which is then compared to the detected audio power level. If the detected audio power level is greater than (or possibly equal to) the maximum threshold power level, the agent is talking too loudly and the appropriate correction is taken. This correction may comprise reporting to the agent, or other ACD personnel, that the agent is talking too loudly. Preferably, this is accomplished via an agent alerting system, such as the agent terminal 118. Alternatively, the audio power level of the agent's speech may be electronically regulated using any of a number of well known methods.

The agent comparison circuit 214 may include an agent minimum circuit 218 for establishing a minimum threshold power level which is compared to the detected audio power level. If the detected audio power level is less than (or possibly equal to) the minimum threshold power level, the agent is talking too softly and the appropriate corrective action is taken. For example, the agent, or other ACD personnel, may be alerted via the agent alerting system that the agent is talking too softly. Further, the agent's speech may be automatically amplified so that the audio power level of the agent's speech is greater than the minimum threshold level.

The loudness of the agent's speech may be automatically adjusted by an audio gain control 220. Preferably, the audio gain control 220 is provided in the digital signal processor 210. The audio gain control 220 may be activated and deactivated by supervisory personnel and the like. The audio gain control 220, when active, automatically adjusts the audio level, or volume, of the agent's speech by small increments, such as 3 dB, to maintain the agent's speech within the preselected maximum and minimum threshold levels. The audio level is adjusted digitally through a table lookup wherein the detected digital audio sample is replaced with another digital sample at a different volume level. Digital audio level control is well known in the art and, therefore, will not be further discussed herein. Those skilled in the art will also readily identify numerous other methods for adjusting audio level which may be advantageously employed in the present invention.

A reporting mechanism, which preferably comprises one or more agent terminals 118, reports the detected audio power level to the agent. Any number of formats may be used to present the detected audio power level to the agent. For example, a maximum alert message may be displayed to the agent when the detected audio power level equals or exceeds the maximum threshold level. Similarly, a minimum alert message may be displayed to the agent when the detected audio power level is less than or equals the minimum threshold level. The detected audio power level may also be presented as real-time bar graphs which rise and fall based on the audio power level of the agent's speech. As those skilled in the art will readily comprehend, numerous methods may be employed to alert the agent of speaking too loudly or too softly. Further, the messages may be displayed on known agent telephonic units having an integral digital display. The messages may also be provided audibly to the agent through the agent telephonic units 106.

Figure 3:
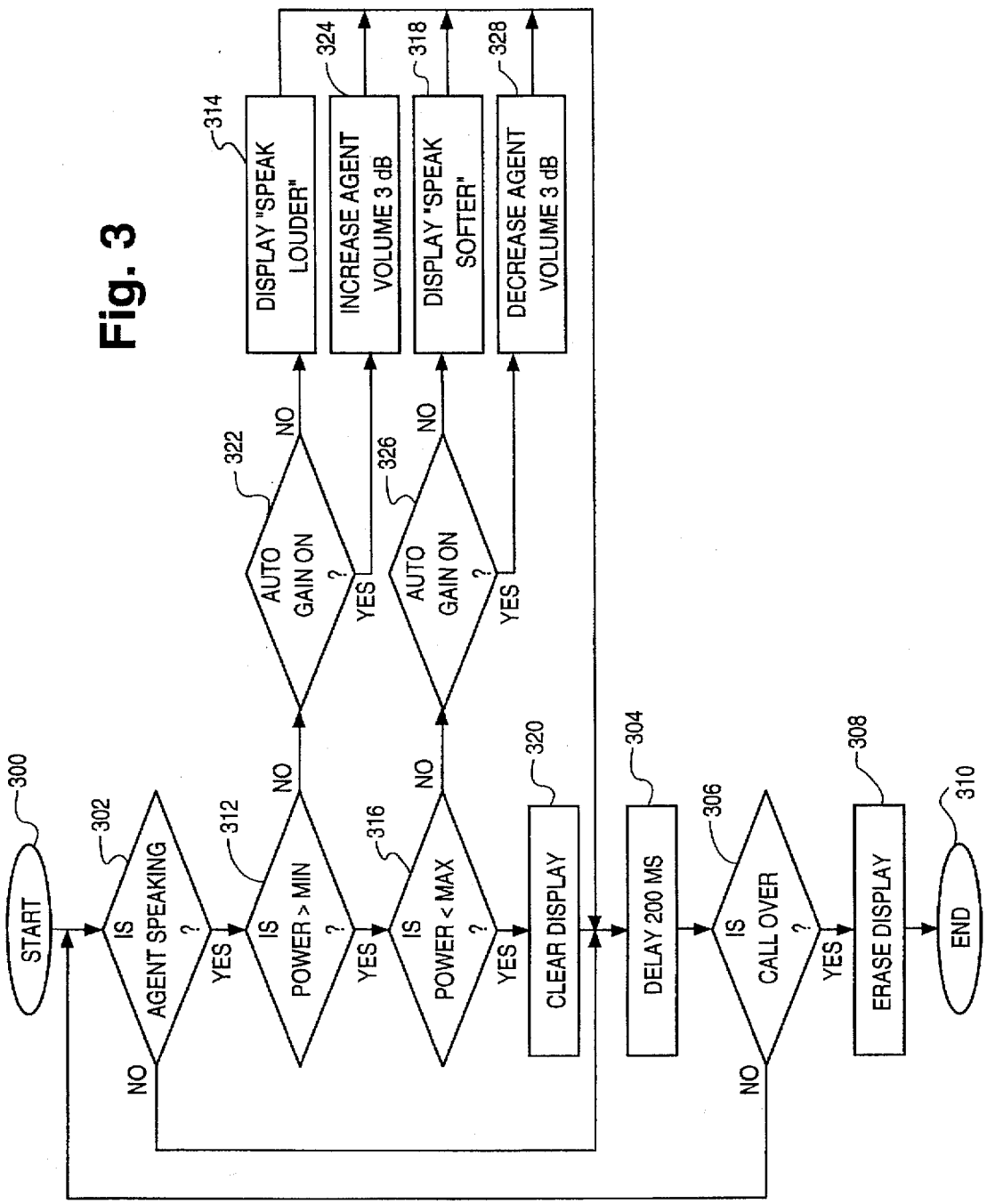
FIG. 3 is a flowchart illustrating the steps of a method for monitoring audio power level of an agent in accordance with the present invention.

A flowchart depicting a method for monitoring speech of an agent during an incoming telephone call with a caller in accordance with the present invention is shown in FIG. 3. The method starts at step 300 and then it is determined whether the agent is speaking at step 302. This may be accomplished by comparing the detected audio power level on the second bus 208 to a baseline audio power level. In a perfect system, the baseline audio power level would be zero; however, due to noise in the system, the baseline audio power level is likely to be slightly above zero.

If the agent is not talking, a delay of 200 ms occurs at step 304. It is then determined whether the call is over at step 306. If the call is over, the appropriate displays are erased at step 308 and the method ends at step 310. If the call is not over at step 304, the method returns to step 302 and again determines whether the agent is speaking.

If the agent is speaking, it is next determined whether the detected audio power level exceeds a preset minimum threshold level at step 312. If the detected audio power level does not exceed the minimum threshold level, the agent is speaking too softly. It is next determined whether the auto gain control 220 is activated at step 322. If not a "Speak Louder" message, or minimum alert message, is displayed to the agent at step 314. If the auto gain control 220 is activated, the volume of the agent's speech is automatically increased by a predetermined amount, such as 3 dB, at step 324.

If the detected audio power level exceeds the minimum threshold level, it is determined whether the detected audio power level is less than a preset maximum threshold level at step 316. If not, it is determined whether the auto gain control 220 is activated at step 326. If so, the volume of the agent's speech is decrease by a predetermined amount, such as 3 dB, at step 328. Although the audio gain control 220 is described as increasing and decreasing the volume of the agent's speech an equal amount (3 dB), those skilled in the art will readily comprehend that the increases and decreases may differ in magnitude. If the auto gain control 220 is not activated, a "Speak Softer" message, or maximum alert message, is displayed to the agent at step 318.

If the detected audio power level falls between the maximum and minimum threshold power levels, the speech of the agent is at an acceptable audio level and all messages to the agent relating to audio power level are erased at step 320. At step 304, a delay of 200 ms occurs and then, at step 306, it is determined whether the call is completed.

As those skilled in the art will readily appreciate, the length of the delay in step 304 may be selected based on a number of factors. For example, hardware limitations may require a delay so that system resources are not being overused. Further, the delay may be selected to correspond to the sample period at which the agent audio power circuit samples the voice signals from the agent on the second bus 218.

Having thus described the invention in detail by way of reference to preferred embodiments thereof, it will be apparent that other modifications and variations are possible without departing from the scope of the invention defined in the appended claims. Therefore, the spirit and scope of the appended claims should not be limited to the description of the preferred versions contained herein.

What is claimed is:

1. A system for monitoring audio power levels of speech during an incoming telephone call from a caller, the incoming telephone call being routed by a telephonic switch to a telephonic unit corresponding to an agent, the system comprising:

an audio power detecting circuit configured to measure a power level of speech transmitted by the telephonic unit of the agent during the incoming telephone call;

a reporting mechanism configured to receive a signal from the audio power detecting circuit indicating that the power level of the speech transmitted by the telephonic unit is not within a predetermined range; and the reporting mechanism configured to provide an indication to at least one of the agent and a supervisory personnel if the power level of the speech transmitted by the telephonic unit of the agent is not within the predetermined range, the indication being external to the telephonic unit of the agent.

2. The system as recited in claim 1 wherein the audio power detecting circuit comprises:

an agent comparison circuit for comparing the measured audio power level with a threshold power level; and wherein the reporting mechanism reports the measured audio power level based on the comparison.

3. The system as recited in claim 2 wherein the agent comparison circuit comprises an agent maximum circuit for establishing a maximum threshold power level which is compared to the measured audio power level.

4. The system as recited in claim 3 wherein the reporting mechanism comprises an agent alerting system for alerting the agent when the measured audio power level exceeds the maximum threshold power level.

5. The system as recited in claim 4 wherein the agent alerting system comprises an agent terminal for visually displaying a maximum alert message to the agent when the measured audio power level exceeds the maximum threshold power level.

6. The system as recited in claim 2 wherein the agent comparison circuit comprises an agent minimum circuit for establishing a minimum threshold power level which is compared to the measured audio power.

7. The system as recited in claim 6 wherein the reporting mechanism comprises an agent alerting system for alerting the agent when the measured audio power level is less than the minimum threshold power level.

8. The system as recited in claim 7 wherein the agent alerting system comprises an agent terminal for visually displaying a minimum alert message to the agent when the measured audio power level is less than the minimum threshold power level.

9. A method for monitoring speech levels of an agent during an incoming telephone call from a caller, the incoming telephone call being routed to a telephonic unit of an agent by a telephonic switch, the method comprising the steps of:

detecting an audio power level of speech transmitted by the telephonic unit of the agent during the incoming telephone call; and providing an indication to at least one of the agent and a supervisory personnel if the audio power level is not within a predetermined range, the indication being external to the telephonic unit of the agent.

10. The method as recited in claim 9 further comprising the step of comparing the detected audio power level to a threshold power level; and wherein the step of providing an indication further comprises the step of reporting the detected audio power level based on the comparison of the detected audio power level with a maximum threshold power level.

11. The method as recited in claim 10 wherein the step of comparing the detected audio power level to the threshold power level comprises the steps of:

establishing a maximum threshold power level; and comparing the detected audio power level to the maximum threshold power level.

12. The method as recited in claim 11 wherein the step of providing an indication comprises the step of displaying a maximum alert message on an agent terminal associated with the agent when the detected audio power level is greater than the maximum threshold power level.

13. The method as recited in claim 10 wherein the step of comparing the detected audio power level to the threshold power level comprises the steps of:

establishing a minimum threshold power level; and comparing the detected audio power level to the minimum threshold power level.

14. The method as recited in claim 13 wherein the step of providing an indication comprises the step of displaying a minimum alert message on an agent terminal associated with the agent when the detected audio power level is less than the minimum threshold power level.

15. The method as recited in claim 9 further including the step of adjusting the audio power level by automatically adjusting the audio power level of the speech transmitted by the telephonic unit of the agent, based on the detected audio power level.

16. The method as recited in claim 15 wherein the step of automatically adjusting the audio power level comprises the steps of:

comparing the detected audio power level to a maximum threshold power level; and automatically decreasing the audio power level of the speech transmitted by the telephonic unit of the agent when the detected audio power level is greater than the maximum threshold power level.

17. The method as recited in claim 15 wherein the step of automatically adjusting the audio power level comprises the steps of:

comparing the detected audio power level to a minimum threshold power level; and automatically increasing the audio power level of the speech transmitted by the telephonic unit of the agent when the detected audio power level is greater than the minimum threshold power level.

18. A system for regulating an audio power level of speech during an incoming telephone call from a caller, the incoming telephone call being routed by a telephonic switch to a telephonic unit corresponding to an agent, the system comprising:

an audio power detecting circuit configured to measure a power level of speech transmitted by the telephonic unit of the agent during the incoming telephone call;

an agent gain control circuit operative to receive the signal from the audio power detecting circuit, and configured to automatically adjust the audio power level of the speech transmitted by the telephonic unit based upon the measured power level, until the measured power level is within the predetermined range, and the adjustment of the audio power level of the speech transmitted by the telephonic unit being independent of a level of speech provided to the telephonic unit by the agent.

19. The system as recited in claim 18 wherein the agent audio power detecting circuit comprises:

an agent comparison circuit for comparing the measured audio power level to a threshold power level; and wherein the agent gain control circuit automatically adjusts the audio power level of the speech transmitted by the telephonic unit of the agent, based on the comparison.

20. The system as recited in claim 19 wherein the agent comparison circuit comprises:

an agent maximum circuit for establishing a maximum threshold power level which is compared to the measured audio power level; and wherein the agent gain control circuit automatically decreases the audio power level of the speech transmitted by the telephonic unit of the agent when the maximum threshold power level is less than the measured audio power level.

21. The system as recited in claim 19 wherein the agent comparison circuit comprises:

an agent minimum circuit for establishing a minimum threshold power level which is compared to the measured audio power level; and wherein the agent gain control circuit automatically decreases the audio power level of the speech transmitted by the telephonic unit of the agent when the measured audio power level is greater than the minimum threshold power level.

* * * * *